US007818690B2

(12) United States Patent
Srivastava

(10) Patent No.: US 7,818,690 B2
(45) Date of Patent: Oct. 19, 2010

(54) FRAMEWORK FOR CREATING USER INTERFACES CONTAINING INTERACTIVE AND DYNAMIC 3-D OBJECTS

(75) Inventor: Vishal Srivastava, Atherton, CA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 11/818,599

(22) Filed: Jun. 15, 2007

(65) Prior Publication Data

US 2008/0313553 A1    Dec. 18, 2008

(51) Int. Cl.
*G06F 15/00*   (2006.01)
*G06F 13/00*   (2006.01)
(52) U.S. Cl. ...................................... 715/853; 345/419
(58) Field of Classification Search ......... 715/762–765, 715/851–853, 740–742; 345/419, 582
See application file for complete search history.

(56) References Cited

U.S. PATENT DOCUMENTS

| 4,965,844 | A | | 10/1990 | Oka et al. | |
|---|---|---|---|---|---|
| 5,303,388 | A | * | 4/1994 | Kreitman et al. | ............ 715/836 |
| 5,363,476 | A | | 11/1994 | Kurashige et al. | |
| 5,898,438 | A | | 4/1999 | Stewart et al. | |
| 5,903,270 | A | | 5/1999 | Gentry et al. | |
| 6,084,592 | A | | 7/2000 | Shum et al. | |
| 6,853,383 | B2 | | 2/2005 | Duquesnois | |
| 2003/0128871 | A1 | | 7/2003 | Naske et al. | |
| 2005/0128212 | A1 | | 6/2005 | Edecker et al. | |
| 2005/0146521 | A1 | | 7/2005 | Kaye et al. | |
| 2006/0020898 | A1 | * | 1/2006 | Kim et al. | ................... 715/764 |

FOREIGN PATENT DOCUMENTS

GB         2387754 A1    10/2003

OTHER PUBLICATIONS

"Windows Presentation Foundation SDK", Date: Jan. 2, 2007, http://blogs.msdn.com/wpfsdk/archive/2007/01/02/interactive-2d-controls-on-3d-surfaces-in-wpf.aspx.
G. Lowe David, "Three-Dimensional Object Recognition from Single Two-Dimensional Images", Date: Mar. 1987, vol. 31, Issue: 3, pp. 355-395, Artificial Intelligence.

* cited by examiner

*Primary Examiner*—Cao "Kevin" Nguyen

(57) ABSTRACT

An arrangement for creating a fully interactive user interface containing 3-D objects is provided by a suite of attached dependency properties in a single class that operates under the Windows Presentation Foundation ("WPF") programming model. The framework for exposing such 3-D interactive functionality, named Facade 3-D, enables application developers to extend the existing functionality of WPF visual objects called FrameworkElements through mapping objects they have defined with 2-D visual trees to 3-D trees which contain arbitrary, application-defined 3-D models. Application users are enabled with highly-configurable ways to interact with the underlying source 2-D FrameworkElements vicariously through manipulation of their 3-D representations called "Facades."

20 Claims, 15 Drawing Sheets

FIG. 6a

```
<Grid>
  <Viewport3D>
    <Viewport3D.Camera>
     [define camera]
    </Viewport3D.Camera>
    <Viewport3D.Children>
     [define lighting visuals, and any static geometry]
     <ModelVisual3D ("RackVisual")>
      <ModelVisual3D.Transform>
       <... />
       <... />
       <... />
       <... />
       <TranslateTransform3D OffsetX="..."
                   OffsetY="1.0"
                   OffsetZ="..." />
       <... />
       <RotateTransform3D (Theta)>
        <RotateTransform3D.Rotation>
         <AxisAngleRotation3D Axis="0,1,0" Angle="{Binding}"/>
        </RotateTransform3D.Rotation>
       </RotateTransform3D>
      </ModelVisual3D.Transform>
      <ModelVisual3D.Content>
       [rack geometry]
      </ModelVisual3D.Content>
      <ModelVisual3D.Children>
       <ModelVisual3D ("CubeVisual")>
        <ModelVisual3D.Transform>
         <ScaleTransform3D ScaleX=""
                  ScaleY=""
                  ScaleZ="0.1"/>
         ...
         <RotateTransform3D (Yaw)>
          <RotateTransform3D.Rotation>
           <AxisAngleRotation3D Axis="0,1,0" Angle="{Binding}"/>
          </RotateTransform3D.Rotation>
         </RotateTransform3D>
         <TranslateTransform3D OffsetX="..."
                   OffsetY="{Binding}"
                   OffsetZ="-2.0"/>
         ...
        </ModelVisual3D.Transform>
```

Key:
— Application
········· Facade 3-D
---- ModelVisual3D repository

FIG. 6c

Key:
— From Application
······ From Facade 3-D
- - - From ModelVisual3D repository

```
<ModelVisual3D ("CubeVisual")>
  [analagous visual for cube representing 3nd item from AlbumList]
</ModelVisual3D>

...

ModelVisual3D x N
(a cube ModelVisual3D object is generated
for each N items in AlbumList; each cube displays
the visuals of its corresponding list item on its
front face)

</ModelVisual3D.Children>
</ModelVisual3D>
```

```
<ModelVisual3D ("xyPlaneVisual")>
  <ModelVisual3D.Transform>
    ...
    <RotateTransform3D (Pitch)>
      <RotateTransform3D.Rotation>
        <AxisAngleRotation3D Axis="1,0,0" Angle="90"/>
      </RotateTransform3D.Rotation>
    </RotateTransform3D>
    ...
  </ModelVisual3D.Transform>
  <ModelVisual3D.Content>
    <Model3DGroup>
      <GeometryModel3D>
        <GeometryModel3D.Geometry>
          [xy plane mesh]
        </GeometryModel3D.Geometry>
        <GeometryModel3D.Material>
          <MaterialGroup>
            ...
```

*FIG. 6d*

Key:
—— From Application
·········· From Facade 3-D
- - - - From ModelVisual3D repository

```
      <DiffuseMaterial>
        <DiffuseMaterial.Brush>
          <VisualBrush>
            <VisualBrush.Visual>
              <Rectangle Background="{StaticResource WhiteDiscRadialBrush}"/>
              [This is the same rectangle as in the application's 2-D visual tree]
            </VisualBrush.Visual>
          </VisualBrush>
        </DiffuseMaterial.Brush>
      </DiffuseMaterial>
     </MaterialGroup>
    </GeometryModel3D.Material>
   </GeometryModel3D>
  </Model3DGroup>
 </ModelVisual3D.Content>
</ModelVisual3D>
 </Viewport3D.Children>
</Viewport3D>
<Grid>
 <Grid.RenderTransform>
   <TranslateTransform X="[some value > app width]"/>
 </Grid.RenderTransform>
 [entire 2D UI from original tree]
</Grid>
</Grid>
```

Event-Action Table For Facade3D

| Pre-requisite action | Event | Action ID | Action taken by Facade 3-D |
|---|---|---|---|
| N/A | Initialization of the Facade3D framework | 1 | Declare static Facade3D attached properties |
| | | 2 | Subscribe to property changed events for many of the above attached properties by adding PropertyChangedCallbacks to the property metadata |
| 2 | "Viewport3D" Facade3D attached property defined on a FrameworkElement | 3 | Subscribe to Viewport3D object's PreviewGotKeyboardFocus event |
| | | 4 | Subscribe to all Viewport3D object's mouse events |
| | | 5 | Translate the 2D UI tree rooted at the defining FrameworkElement off-screen (if an application defines the Facade3D.Viewport3D property, it states that it wants users to see and interact with the 3-D facade visuals instead of the 2D source visuals). |
| 2 | "Visual3DTemplate" Facade3D attached property defined on a FrameworkElement | 6 | Perform a deep clone of the specified ModelVisual3D template (usually from a repository) |
| | | 7 | Set the Facade3D.Visual3D to the cloned ModelVisual3D |
| 7 | "Visual3D" Facade3D attached property defined on a FrameworkElement | 8 | Subscribe to the defining FrameworkElement's Loaded event |
| | | 9 | Subscribe to the defining FrameworkElement's Unloaded event |
| 2 | "Material" Facade3D attached property defined on a FrameworkElement | 10 | Set Facade3D.Material to a reference to the specified element in the application visual tree |

| Pre-requisite action | Event | Action ID | Action taken by Facade 3-D |
|---|---|---|---|
| 8 | Facade3D-enhanced FrameworkElement Loaded (encompasses all scenarios where the FrameworkElement is added to the application visual tree, including complex ones - e.g., the changing of the ItemsSource of a ListBox) | 11 | Search through the FrameworkElement's ModelVisual3D tree for a DummyMaterial, change it to a DiffuseMaterial with a VisualBrush, and attach the Facade3D.Material root to the VisualBrush |
|  |  | 12 | Assign a clone of Facade 3-D DOF Transform Stack to the counterpart ModelVisual3D's transform |
|  |  | 13 | Initialize the stack objects' properties with the corresponding Facade3D property values set in the application XAML |
|  |  | 14 | Create two-way bindings from the FrameworkElement's Facade3D transformation properties (i.e., Facade3D.Yaw) to the analagous properties of objects in the transformation stack objects. |
|  |  | 15 | Wire this FrameworkElement's ModelVisual3D counterpart (its Facade3D.Visual3D) into the Visual3D tree (specifically, add this ModelVisual3D to the Children list of the ModelVisual3D counterpart of the element's nearest 2D ancestor that defines a Facade3D.Visual3D) |
| 9 | Facade3D-enhanced FrameworkElement Unloaded | 16 | Remove the element's 3-D counterpart from the Visual3D tree |
| 4 | Mouse event on Viewport3D | 17 | Use 3-D hit testing to determine the ModelVisual3D under the mouse at the time of the mouse event |
|  |  | 18 | Iterate up the 3-D tree until a ModelVisual3D defined as the Facade3D.Visual3D for a FrameworkElement is found |
|  |  | 19 | Re-raise the same mouse event that was captured on the corresponding FrameworkElement |
| N/A | Keyboard input events or Focus change events | 20 | Since the 2-D visual tree of FrameworkElements still exists in the application visual tree, they still handle and transfer keyboard input and focus in exactly the same way as they would in 2-D. |
| 14 | Facade3D transformation properties are set (by XAML/C# code) or updated (by animation, binding, triggers, etc.) | 21 | Because of bindings created by Façade 3-D, WPF will update/animate the appropriate properties within the transformation stack objects accordingly |
| 11 | 2D visuals that occur within a FrameworkElement's Facade3D.Material's tree change for any reason (image, layout, input-based changes, etc.) | 22 | WPF updates the 3-D textures painting the geometry automatically because of the presence of the VisualBrush |

FRAMEWORK FOR CREATING USER INTERFACES CONTAINING INTERACTIVE AND DYNAMIC 3-D OBJECTS

BACKGROUND

The Microsoft .NET Framework is a managed programming model for Microsoft Windows that includes Windows Presentation Foundation ("WPF"). WPF provides application developers with a unified programming model for building rich Windows smart client user experiences particularly including user interfaces ("UIs") that make better use of current hardware and technologies. WPF provides a richer set of drawing features and performs considerably faster than its predecessor, the Win32-based UI graphics subsystem using Microsoft Windows Graphics Device Interface ("GDI") and Microsoft Windows GDI+ which were originally developed more than 20 years ago.

WPF provides developers with a way to create applications having advanced UI graphics with fewer constraints in how graphical elements are controlled. WPF provides a library of commonly used, vector-drawn 2-D (two-dimension) shapes, such as rectangles and ellipses, which are not just shapes but are programmable elements that implement many of the features expected from most common controls including keyboard and mouse input. If the shapes in the library are not sufficient, WPF can support geometries and paths by which developers may create custom shapes, or use as drawing brushes, or use to clip other WPF elements.

WPF provides a library of 2-D classes that a developer may use to create a variety of effects. The 2-D rendering capability of WPF provides the ability to paint UI elements using brushes. Use of a "Visual Brush," for example, enables a UI element to be painted with any visual tree. Those UI elements in the visual tree may be manipulated by using translation, rotation, scaling, and skewing. WPF further provides a set of 3-D (three-dimensional) rendering capabilities that integrate with 2-D graphics support in WPF so that developers can create interesting layouts, UIs, and data visualizations. The WPF 3-D implementation allows developers to draw, transform, and animate 3-D graphics in both mark-up and procedural code. Developers can combine 2-D and 3-D graphics to create rich controls, provide complex illustrations of data, or enhance the user experience of an application's interface.

While the WPF 3-D capabilities are well suited to many scenarios, the 3-D objects in a UI space are limited in that they are not interactive or dynamic in the same manner as their WPF 2-D counterparts. While an application developer can presently take a 2-D interface and place it on a 3-D surface, there is no currently supported functionality in WPF to enable interaction with that interface while in the 3-D space. For example, a UI might include some controls such as buttons, scroll bars, and text entry boxes. While WPF currently supports user interaction with the UI to enable the buttons to be pushed, scrolls bars to be used, and text to be entered by the application's user, such supported interaction ends once the interface is put into the 3-D space.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for creating a fully interactive and dynamic UI containing 3-D objects is provided by a suite of attached dependency properties in a single static class that operates under the WPF programming model. The framework for exposing such 3-D interactive functionality, named Facade 3-D, enables application developers to extend the existing functionality of WPF interactive visual objects called FrameworkElements. This is accomplished by mapping FrameworkElements that comprise 2-D visual trees they have defined to 3-D objects with arbitrary 3-D geometry that are assembled into a parallel 3-D visual tree. Application users are enabled with highly-configurable ways to interact with the underlying source 2-D FrameworkElements vicariously through manipulation of their 3-D representations called "Facades."

In an illustrative example, the mapping of the 2-D visual tree to the 3-D visual tree is effectuated using an interface comprising XAML-accessible (eXtensible Application Markup Language-accessible) static attached dependency properties that are definable by the application developer on the source FrameworkElements. Application developers may create interactive UIs in a typical manner for a 2-D WPF application by defining a variety of FrameworkElements, and then providing these objects with 3-D facades having interactive and visual properties that are controllable using the developer-defined attached dependency properties. Advantageously, very few new objects need to be explicitly defined by the application developer to fully specify the desired interactive 3-D functionality.

The 2-D visual tree hierarchies are utilized by the Facade 3-D framework to systematically construct and synchronize the structures of the corresponding 3-D visual trees. In addition, Facade 3-D further automatically moves the 2-D visuals of the source FrameworkElements off the display screen so that only the Facade 3-D geometry remains visible and available for interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIGS. 6a, 6b, 6c, and 6d show an illustrative application 3-D visual tree using a XAML-like (Extensible Application Markup Language) expression that is comprised of segments which are sourced from application XAML, ModelVisual3D repositories, and the Facade 3-D framework;

FIGS. 18a and 18b show an event-action table in summary form that is associated with the Facade 3-D framework.

Like reference numerals indicate like elements in the drawings.

DETAILED DESCRIPTION

Figure 1:
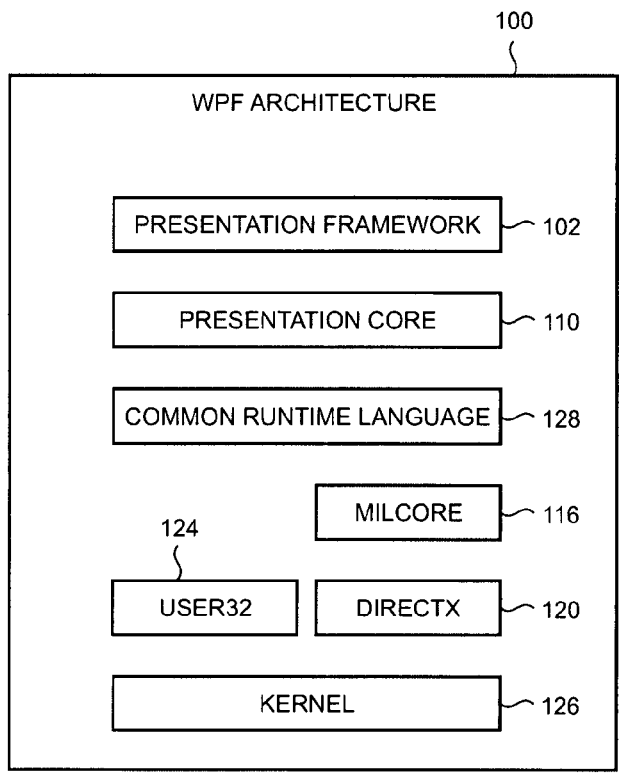
FIG. 1 shows an illustrative code component architecture of WPF used in the WPF/.NET application development environment.

The primary WPF programming model is exposed through managed code classes in the WPF/.NET application development environment that run on top of the common language runtime ("CLR"). FIG. 1 shows the major code components of the WPF architecture 100 which include a Presentation Framework 102, Presentation Core 110, and Milcore 116 (where "Mil" stands for Media Integration Library). Of these components, only Milcore 116, which functions as the low-level WPF graphic composition engine, represents an unmanaged component. Milcore 116 is written in unmanaged code to enable tight integration with the DirectX APIs 120.

All UI display in WPF is done through the DirectX APIs 120 (application programming interfaces) to the kernel 126 to thereby communicate with the operating system and/or graphic drivers etc., which thus allows for efficient hardware and software rendering. While the User32 library 124 is utilized to interact with various legacy elements, for example, to handle allocation of space to windows on the display, the DirectX APIs 120 renders all of the content inside the window.

The CLR 128 is the core runtime engine in the Microsoft .NET Framework for executing applications. The CLR 128 supplies the managed code components—the Presentation Framework 102 and Presentation Core 110—with services such as cross-language integration, code access security, object lifetime management, resource management, type safety, pre-emptive threading, metadata services (type reflection), and debugging and profiling support.

The Presentation Framework 102 sits at the top level in the WPF architecture 100 and provides a managed API that provides access to the underlying functionality. Many developers working in the WPF environment will work exclusively with this Presentation Framework 102. The framework includes a large number of standard controls (such as Button, Label, Menu), layout panels, 2-D and 3-D graphics and text primitives, support for imaging effects, media, animation and document services, and support for interoperability with GDI, DirectX and Windows Forms/GDI+.

The Presentation Core 110 is a lower-level API in the WPF architecture 100 that enables interaction between the development framework provided by the managed Presentation Framework 102 and the unmanaged WPF graphics handling core comprised of Milcore 116 and the DirectX APIs 120. Most elements in WPF derive from a base Visual class which is exposed by the Presentation core 110 API. The Visual class is the base abstraction by which data is composited for output onto the screen and thus provides for building a tree of visual objects by WPF applications, where each visual tree optionally contains drawing instructions and metadata about how to render those instructions (clipping, transformation, etc.).

Visual objects in the Visual class are the core WPF objects whose primary role includes providing graphic rendering support. The Visual object provides support for output display, transformations, clipping, hit testing (i.e., determining whether a coordinate or geometry is contained within the bounds of the visual object), and bounding box calculations. However, the Visual object does not include support for non-rendering functions such as event handling, layout, styles, data binding, or globalization.

Figure 2:
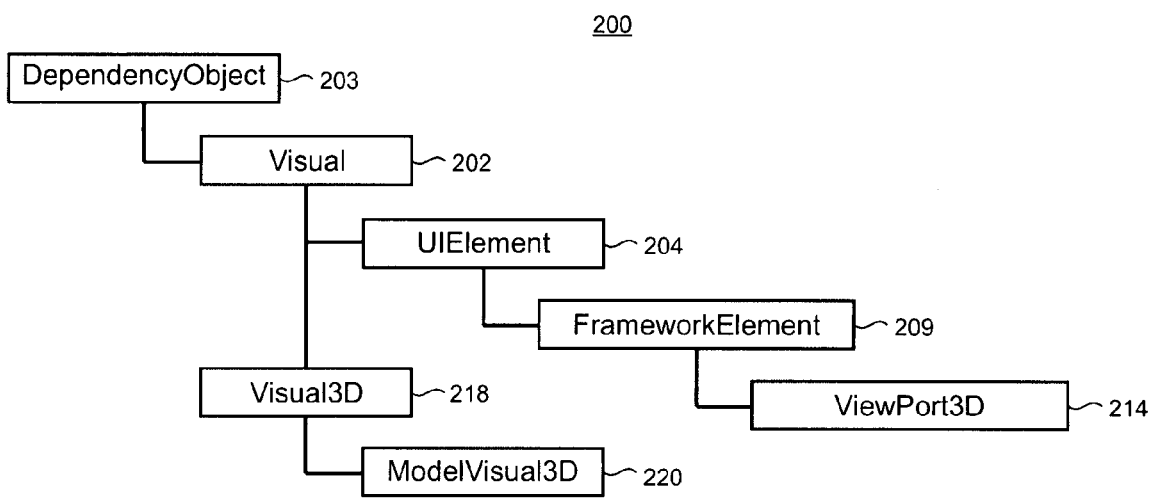
FIG. 2 shows an illustrative hierarchy of visual objects that are exposed in WPF.

FIG. 2 shows the hierarchy 200 of Visual objects 202 that are exposed in WPF which inherits from DependencyObject 203. The DependencyObject represents a WPF object that participates in the dependency property system as described below.

The UIElement class 204 is a base class for WPF implementations that provides a starting point for element layout services, and also exposes virtual methods that derived classes can override, which can influence the layout rendering behavior of the element and its child elements. Much of the input and focusing behavior for elements in general is also defined in the UIElement class 204. This includes the events for the keyboard, mouse, and stylus input, and related status properties. The UIElement 204 also includes APIs that relate to the WPF event model, including methods that can raise specific routed events that are sourced from an element instance.

The FrameworkElement class 209 is the connecting point between WPF framework-level element classes and the WPF core-level set of UIElement presentation services. Accordingly, FrameworkElement 209 builds on the layout introduced by UIElement 204 and makes it easier for layout authors to have a consistent set of layout semantics. As noted above, it allows the developer to override the automatic layout functionality introduced by UIElement 204 by specifying alignment and layout properties for controls. In addition, two critical elements that FrameworkElement 209 introduces to the WPF are data binding, which enables application developers to bind and manipulate within applications, and styles, which are a set of properties applied to content used for visual rendering.

WPF 3-D views are composed within a Viewport3D 214 and typically use one or more objects to describe geometry, light sources, camera view, and material. Material is described using a property in WPF (properties are described below in more detail) which indicate the surface conditions of a 3-D model. If the property is empty, then the model is not visible in the UI. The Visual3D class 218 is the base class for all 3-D visual elements in WPF. The ModelVisual3D class 220 provides services and properties common to all 3-D visual objects, including hit testing and coordinating transformation.

WPF applications can be deployed on a desktop PC (personal computer) or hosted in a web browser, for example, and can provide very graphic-rich user experiences. WPF applications are typically built using a number of Extensible Application Markup Language ("XAML," pronounced "ZAM-el") pages plus optional supporting code, called "code-behind." The XAML markup is utilized to declaratively set application properties, resources, and register events, while handling events and implementing the application-specific behavior in the code-behind.

At the core of all WPF applications is the Application object which operates in the Presentation Framework 102 (FIG. 1). The Application object forms the interface between the application and the operating system and enables the application to be managed as a collection of XAML pages.

A WPF application works by creating a tree of elements through the XAML markup and optional code-behind that becomes the application's "visual tree." The visual tree contains all the visual elements used in an application's UI. Since a visual element contains persisted drawing information, the visual tree may be thought of as a scene graph containing all of the rendering information needed to compose the output to a display device. The visual tree is thus the accumulation of all visual elements created directly by the application whether in markup or code. The visual tree also contains any visual elements that may be created through application of any templates.

Figure 3:
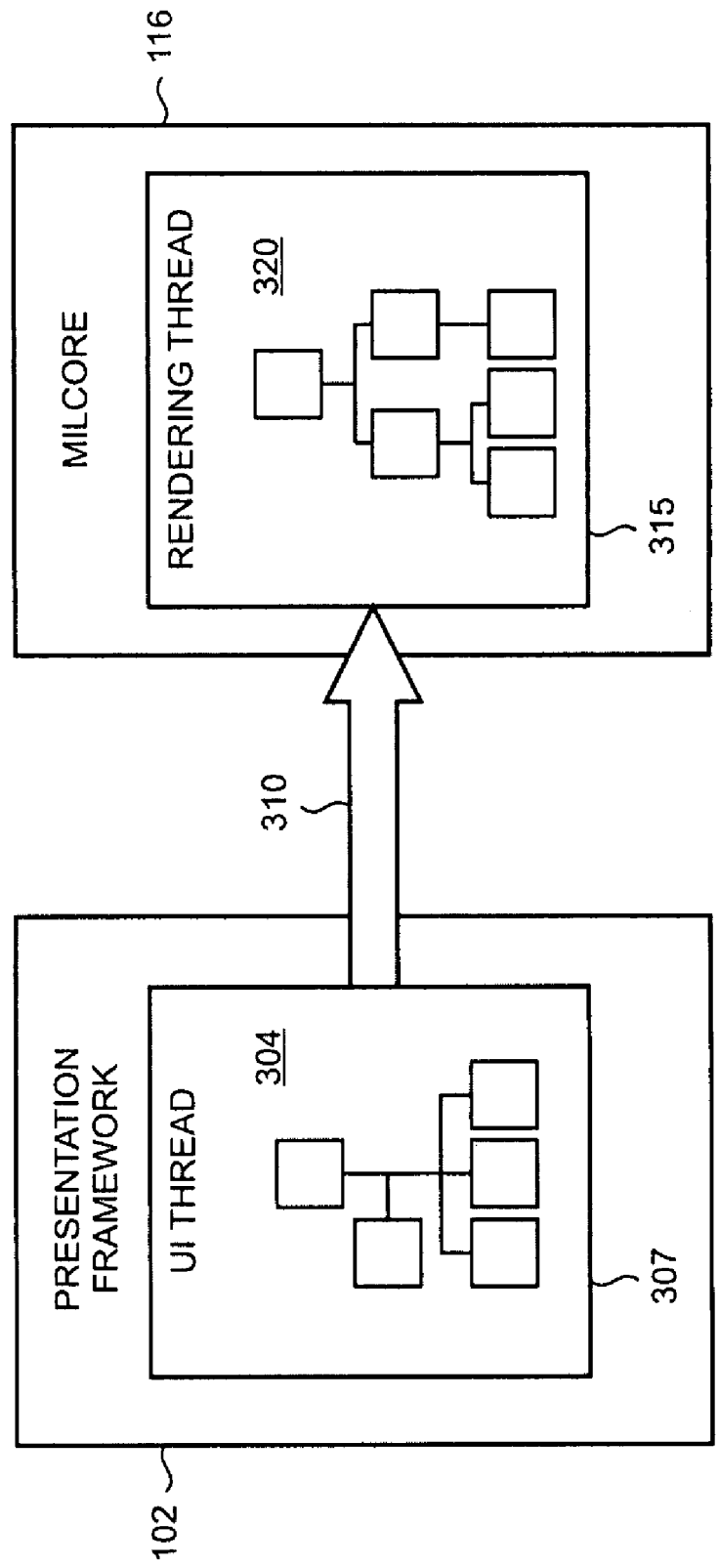
FIG. 3 shows interaction between a visual tree on a UI thread and a rendering tree on a rendering thread.

As shown in FIG. 3, a simplified graphical representation of a visual tree 304 is created by a WPF application on a UI thread 307 in managed code in the Presentation Framework 102. The visual tree 304 is communicated via the Presentation Core 110 to the Milcore 116 over a communication channel 310 as a data structure where it is effectively replicated on a rendering thread 315 as a composition tree 320. Note that the visual tree 304 and composition tree 320 are not necessarily identical. For example, off-screen elements in the visual tree 304 may not be included in the composition tree 320.

The rendering thread 315 is responsible for traversing (i.e., "walking") the composition tree 320 and rendering the UI through the DirectX APIs 120. When an application wants to make a change to the displayed UI, the markup or code results in edits to the visual tree 304, for example by child elements being added or removed; the modifications to the visual tree 304 are sent as edits which are then reflected in the composition tree 320. The rendering thread 315 then re-composes and re-renders the changed portions of the UI, although it does not re-render some element's sub-trees in the composition tree 320 that, for example, are occluded in the UI display.

A WPF application utilizes a set of services which can be used to extend the functionality of a CLR property. Collectively, these services are known as the WPF property system. A property that is backed by the WPF property system is known as a dependency property.

The purpose of dependency properties is to provide a way to compute the value of a property based on the value of other inputs. These other inputs might include system properties such as themes and user preference, just-in-time property determination mechanisms such as data binding and animations/storyboards, multiple-use templates such as resources and styles, or values known through parent-child relationships with other elements in an element tree.

In addition, a dependency property can be implemented to provide self-contained validation, default values, callbacks that monitor changes to other properties, and a system that can coerce property values based on potential runtime information. Derived classes can also change some specific characteristics of an existing property by overriding dependency property metadata, rather than overriding the actual implementation of existing properties or creating new properties.

The WPF property system further includes a metadata reporting system that goes beyond what can be reported about a property through reflection or CLR characteristics. Metadata for dependency properties can also be assigned uniquely by the class that defines a dependency property, and can be changed when the dependency property is added to a different class, and be specifically overridden by all derived classes that inherit the dependency property from the defining base class.

XAML defines a concept called an "attached property" which is intended to be used as a type of global property that is settable on any object. Under the WPF framework, most attached properties are implemented as dependency properties. Attached properties are set using the syntax:

AttachedPropertyProvider.PropertyName

Attached dependency properties are often created in order to have a property setting mechanism available for classes other than the defining (i.e., owning) class. The present framework for creating UIs containing 3-D objects uses attached dependency properties in another way in order to implement a service in which the Facade 3-D class represents a 3-D functionality service that is available to other WPF classes, in particular FrameworkElement. Using attached dependency properties in such a manner enables such classes to integrate the 3-D functionality service very transparently.

Accordingly, one of the main components of Facade 3-D is a single static WPF class that defines attached dependency properties and associated methods that are used to enhance implementations of existing instances of 2-D FrameworkElements to thereby enable a 3-D UI to incorporate much of the interactivity that is built into the UI provided by the underlying 2-D FrameworkElements. This aspect of the present arrangement advantageously enables WPF application developers to avoid needing to create custom 3-D objects or subclasses to re-implement such interactivity. Instead, they can leverage their existing FrameworkElement properties.

For example, if an application developer wants to create a 3-D object with button functionality, then, rather than creating code for button-like functions into a new 3-D object or subclass of an existing FrameworkElement, the developer can simply provide an existing instance of a WPF button with the Facade 3-D attached dependency properties. In most cases, this can be done purely with XAML without having to provide any code-behind. Use of such a technique advantageously enables application developers to develop complete and functional traditional 2-D UIs first, and then transform them into fully functional, interactive 3-D UIs later simply by defining certain attached properties on the original 2-D objects.

Figure 4:
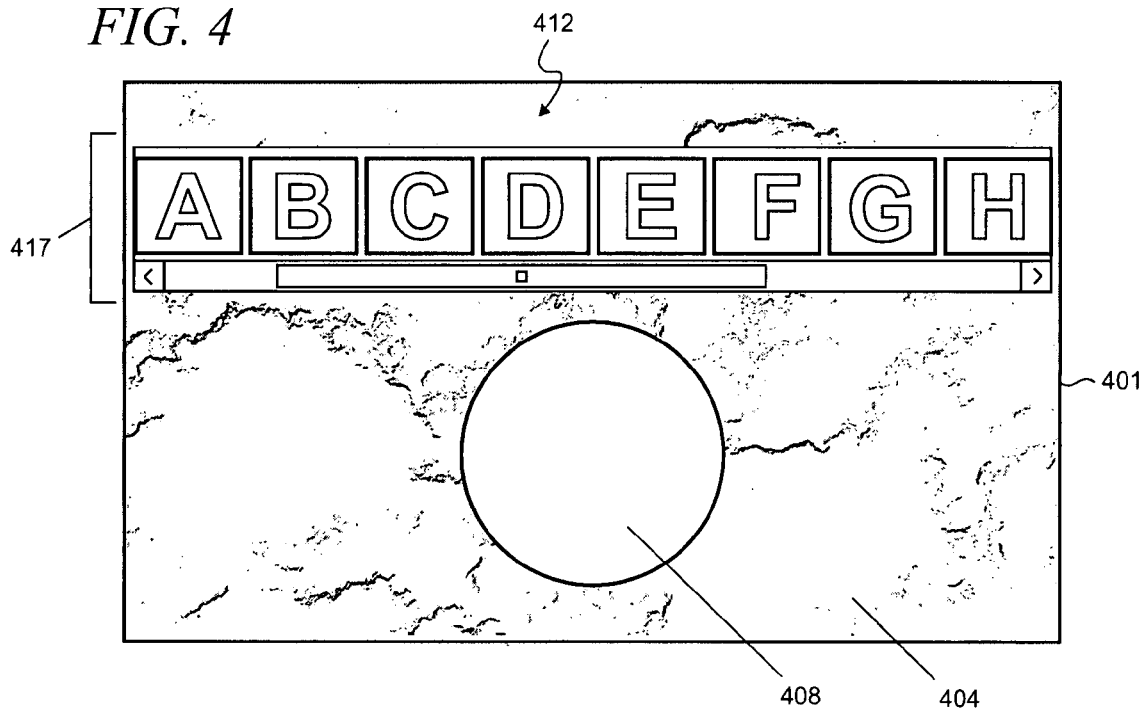
FIG. 4 shows an illustrative screen shot supplied by a UI generated at runtime by an application using 2-D FrameworkElements.
Figure 5:
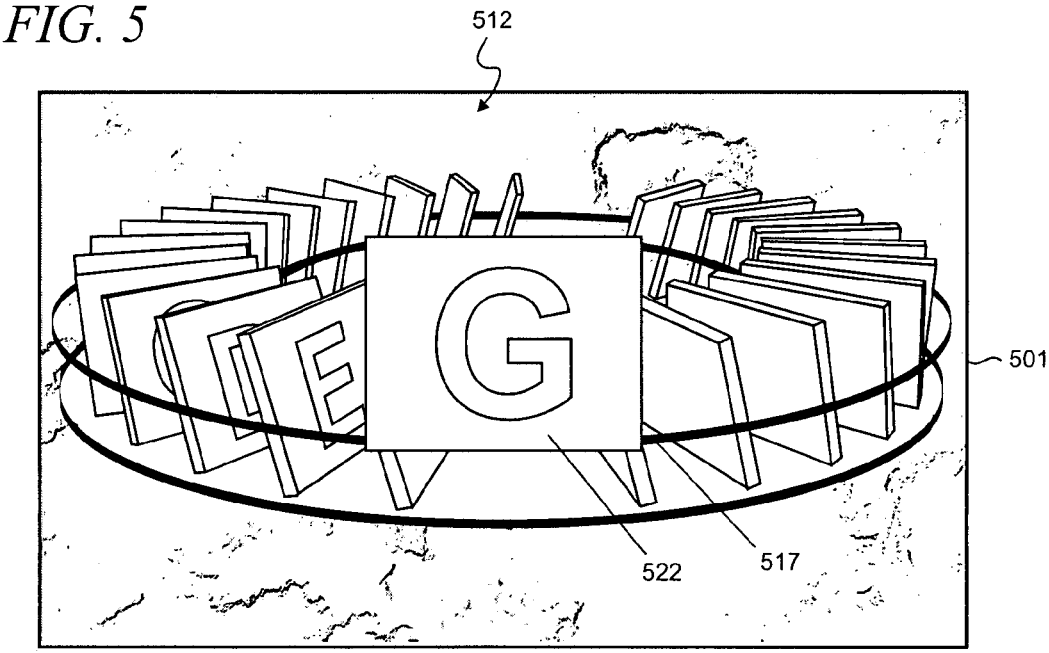
FIG. 5 shows an illustrative screen shot supplied by a UI generated by an application composed of FrameworkElements enhanced by the Facade 3-D framework.

FIGS. 4 and 5 are simplified representations of respective screen shots of UIs using existing 2-D WPF elements, and using those WPF elements expressed using the Facade 3-D attached dependency properties. The UI screenshot 401 shown in FIG. 4 is comprised of a number of objects which are displayed on a screen including a background cloud image 404, a circular object 408, and a series of graphical objects 412 that are composed to appear as compact disc ("CD") jewel boxes with associated cover artwork. For the ease and clarity of exposition, the CD artwork is simply shown in FIG. 4 as respective alphabetical characters. The CD jewel box objects 412 are arranged in a linear scrollable window, as indicated by reference numeral 417. A user may scroll through the CDs in the window, for example, by using the mouse or keyboard arrow keys, and may position the scrollable window as desired within the UI.

Figure 4A:
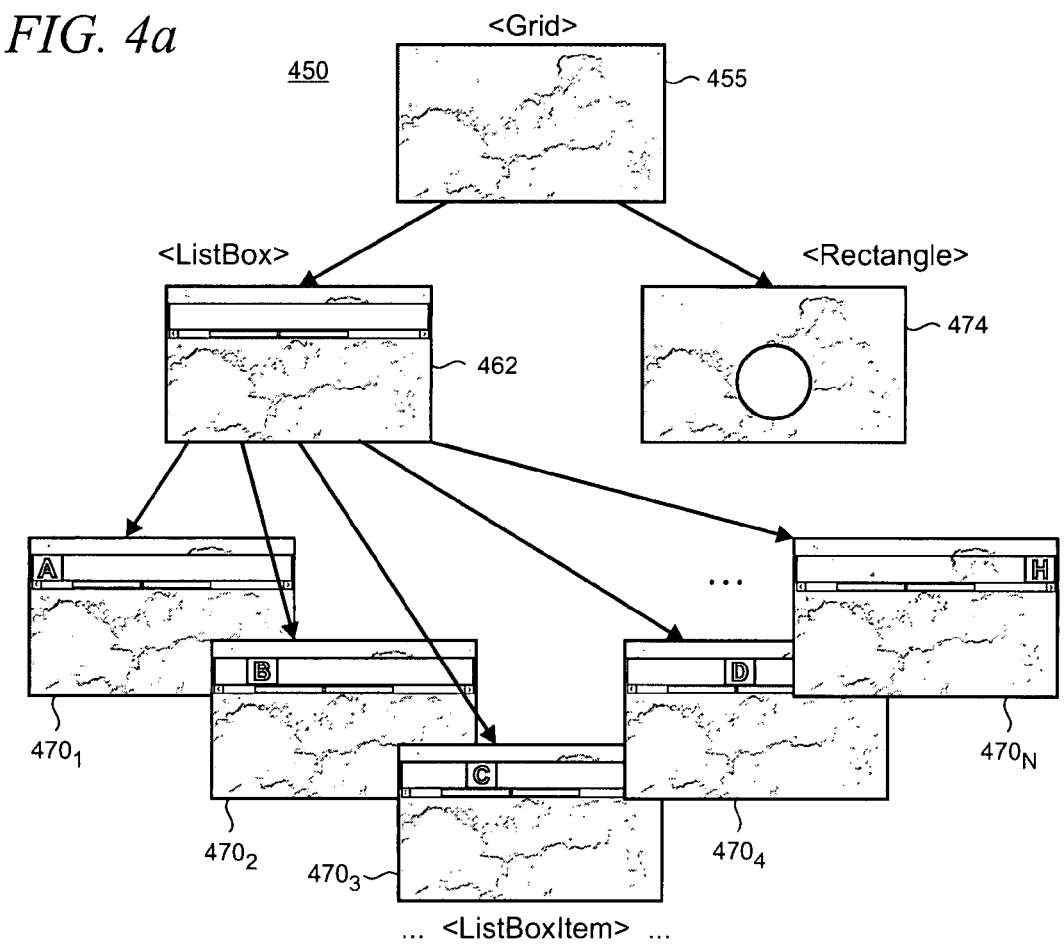
FIG. 4a shows a graphical form of the 2-D visual tree for the UI shown in FIG. 4.

FIG. 4a shows a graphical form of the 2-D visual tree 450 for the UI shown in FIG. 4. The 2-D visual tree 450 shows how each node of the tree (and its ancestors) appear when rendered by the rendering thread 315 (FIG. 3) onto a display. The first element is the Grid control 455 that provides a grid container into which other elements are placed. A Listbox control 462 implements the scrollable list of selectable items in the UI which, in this example includes Listbox Items 470—1, 2 . . . N comprising the respective one in the series of CD objects 412 in FIG. 4. A Rectangle control 474 implements the circular object in the UI.

Shown below is the application markup, expressed in XAML, that is associated with the UI shown in FIG. 4 and the 2-D visual tree 450 that is shown in FIG. 4a. The markup is used to define the UI elements, data binding, eventing, and other features provided by the WPF framework as required to implement the illustrative 2-D UI shown.

```
<Grid>
 <Viewport3D Name="viewport">
  <Viewport3D.Camera>
   [define camera]
  </Viewport3D.Camera>
  <Viewport3D.Children>
   [define lighting visuals, and any static geometry]
  </Viewport3D.Children>
 </Viewport3D>
 <Grid>
  <ListBox ItemsSource="{StaticResource AlbumList}"
        ItemTemplate="{StaticResource AlbumTemplate}">
   <ListBox.ItemContainerStyle>
    <Style>
     <Setter Property="Width" Value="50"/>
     <Setter Property="Height" Value="50"/>
     <Style.Triggers>
      <Trigger Property="IsSelected" Value="True">
       <Trigger.EnterActions>
        <Storyboard>
         <DoubleAnimation TargetProperty="Width" To="75"/>
         <DoubleAnimation TargetProperty="Height" To="75"/>
        </Storyboard>
       </Trigger.EnterActions>
       <Trigger.ExitActions>
        <Storyboard>
         <DoubleAnimation TargetProperty="Width" To="50"/>
         <DoubleAnimation TargetProperty="Height" To="50"/>
        </Storyboard>
       </Trigger.ExitActions>
      </Trigger>
     </Style.Triggers>
    </Style>
   </ListBox.ItemContainerStyle>
   <ListBox.Triggers>
    <EventTrigger RoutedEvent="SelectionChanged">
     <Storyboard>
      <DoubleAnimation TargetProperty="Opacity" From="0.7"
            To="1.0"/>
     </Storyboard>
    </EventTrigger>
   </ListBox.Triggers>
  </ListBox>
  <Rectangle Background="{StaticResource WhiteDiscRadialBrush}"
        Width="400" Height="400"/>
 </Grid>
</Grid>
```

The markup below shows the original application XAML as enhanced by the present Facade 3D framework. The differences from the original 2-D application XAML are underlined.

```
<Grid>
 <Viewport3D Name="viewport">
  <Viewport3D.Camera>
   [define camera]
  </Viewport3D.Camera>
  < Viewport3D.Children>
   [define lighting visuals, and any static geometry]
  </Viewport3D.Children>
 </Viewport3D>
 <Grid Facade3D.Viewport3D="{Binding viewport}" Facade3D.Enabled="True">
  <ListBox ItemsSource="{StaticResource AlbumList}"
        ItemTemplate="{StaticResource AlbumTemplate}"
        Facade3D.Visual3DTemplate="{StaticResourceRackVisual}"
        Facade3D.TranslateY="1.0">
   <ListBox.ItemContainerStyle>
    <Style>
     <Setter Property="Width" Value="50"/>
     <Setter Property="Height" Value="50"/>
     <Setter Property="Facade3D.Visual3DTemplate"
           Value="{StaticResource CubeVisual}"/>
     <Setter Property="Facade3D.Material"
           Value="{Binding FindAncestor Type:ListBoxItem}"/>
     <Setter Property="Facade3D.TranslateZ" Value="-2.0"/>
     <Setter Property="Facade3D.Yaw" Value="90.0"/>
     <Setter Property="Facade3D.ScaleZ" Value="0.1"/>
     <Style.Triggers>
      <Trigger Property="IsSelected" Value="True">
       <Trigger.EnterActions>
        <Storyboard>
         <DoubleAnimation TargetProperty="Width" To="75"/>
         <DoubleAnimation TargetProperty="Height" To="75"/>
         <DoubleAnimation TargetProperty="(Facade3D.TranslateY)" To="0.7"/>
         <DoubleAnimation TargetProperty="(Facade3D.Yaw)" To="0.0"/>
        </Storyboard>
       </Trigger.EnterActions>
       <Trigger.ExitActions>
        <Storyboard>
         <DoubleAnimation TargetProperty="Width" To="50"/>
         <DoubleAnimation TargetProperty="Height" To="50"/>
         <DoubleAnimation TargetProperty="(Facade3D.Yaw)" To="90.0"/>
         <DoubleAnimation TargetProperty="(Facade3D.TranslateY)" To="0.0"/>
        </Storyboard>
       </Trigger.ExitActions>
      </Trigger>
     </Style.Triggers>
    </Style>
```

-continued

```
    </ListBox.ItemContainerStyle>
    <ListBox.Triggers>
      <EventTrigger RoutedEvent="SelectionChanged">
        <Storyboard>
          <DoubleAnimation TargetProperty="Opacity" From="0.7" To="1.0"/>
          <DoubleAnimation TargetProperty="(Facade3D.Theta)"
              To="{Binding Converter=SelectedItemOrderToAngle}"/>
        </Storyboard>
      </EventTrigger>
    </ListBox.Triggers>
  </ListBox>
  <Rectangle Background="{StaticResource WhiteDiscRadialBrush}"
      Width="400" Height="400"
      Facade3D.Visual3DTemplate="xyPlaneVisual"
      Facade3D.Pitch="90"
      Facade3D.Material="{BindingFindAncestorType:Rectangle}"/>
 </Grid>
</Grid>
```

The utilization of the Facade 3-D enhanced application XAML shown above results in a UI having fully interactive 3-D objects as shown by the illustrative screenshot 501 in FIG. 5. In this particular illustrative example of Facade 3-D, no application-level code-behind is used.

The 3-D UI uses the same CD jewel boxes (indicated by reference numeral 512 in FIG. 5) as are used in the illustrative WPF 2-D UI shown in FIG. 4. But rather than simply scrolling along in a flat, linear window in response to user input, the CD objects 512 rotate in a 3-D carousel arrangement 517. When a user selects a particular CD object 512 through a mouse click anywhere on the 3-D facade, the carousel is animated to rotate and then the selected CD object moves from its position in the carousel to a front and center position as shown by CD object 522 (which has its graphic artwork represented by the letter "G"). When another CD object 512 is selected by the user in the UI, the previously selected CD object moves from its front and center position back to a slot in the carousel 517. Keyboard functionality is also maintained from the 2-D example shown in FIG. 4 because the underlying 2-D visual tree is persisted.

Figure 5A:
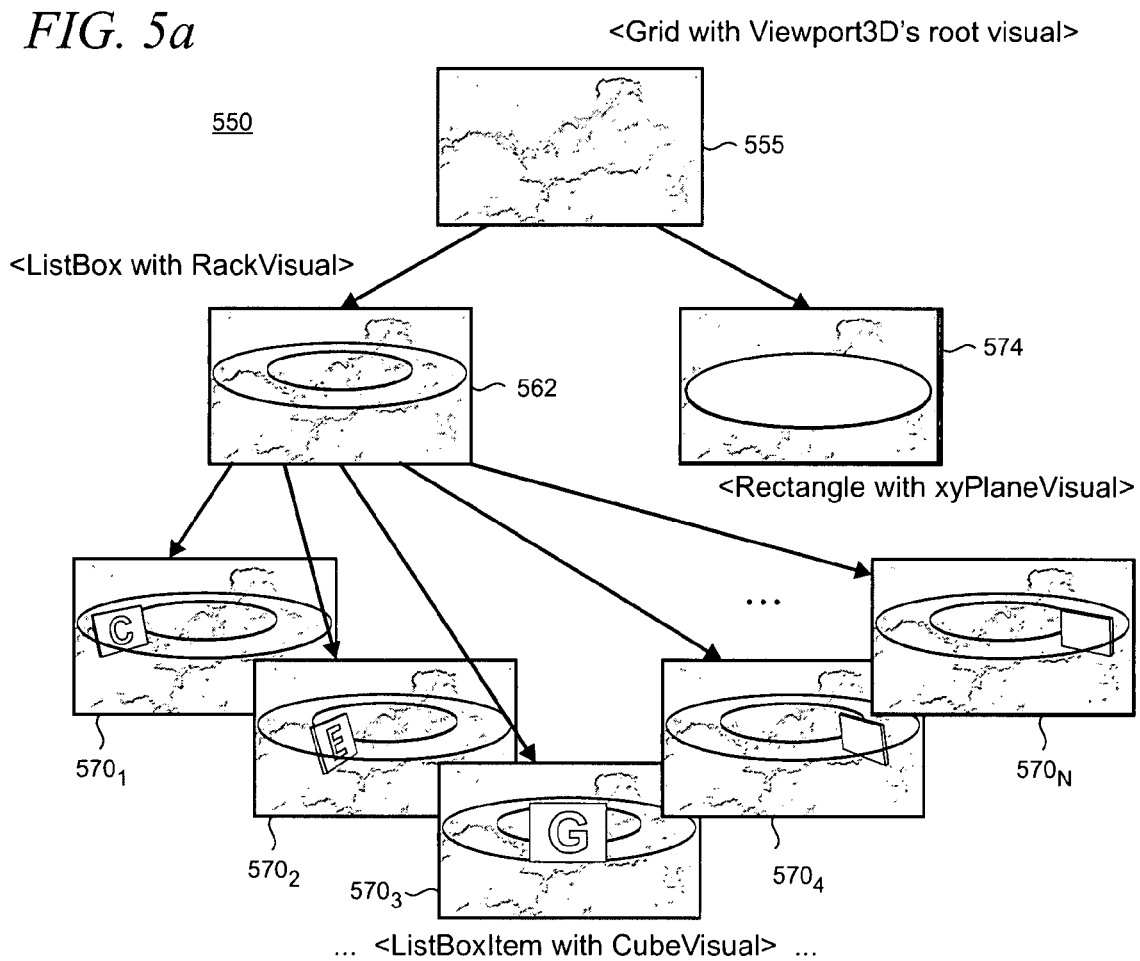
FIG. 5a shows a graphical form of the 3-D visual tree for the UI shown in FIG. 5.
Figure 6B:
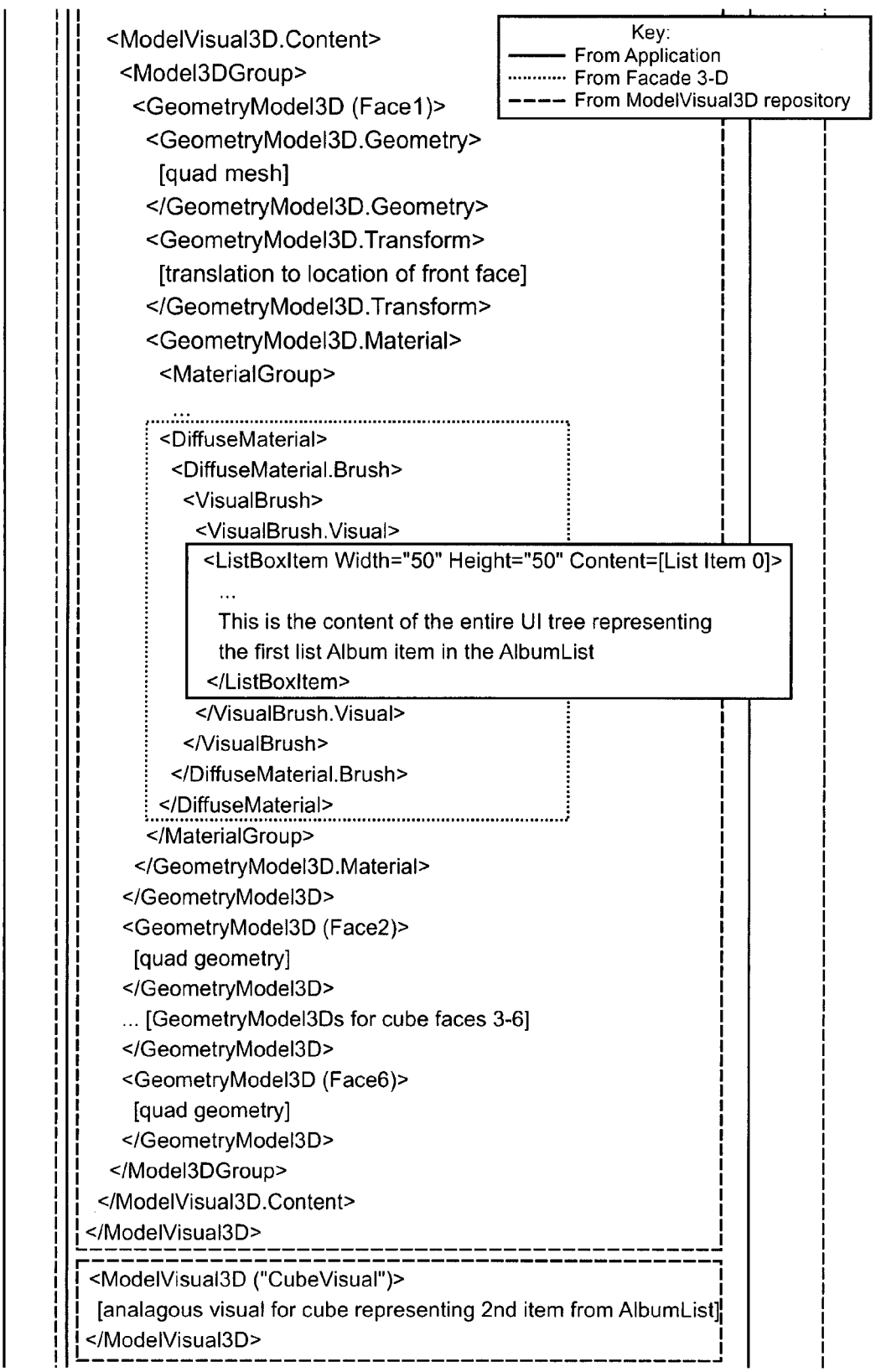

FIG. 5A shows a graphical form of the 3-D visual tree 550 utilized by the 3-D UI represented by screenshot 501. The 3-D visual tree 550 shows how each node of the tree (and its ancestors) appear when rendered by the rendering thread 315 (FIG. 3). As shown, the 2-D and 3-D visual trees share parallel structures. The first element in the visual tree 550 includes the Grid control 555 that specifies a Facade3D.Viewport3D attached dependency property. This property references a Viewport3D that contains all of the descendent 3-D facades used in the 3-D UI. This is typically specified as a binding to a Viewport3D that exists elsewhere in the application's visual tree.

FrameworkElements may implement a facade through definition of a Facade3D.Visual3DTemplate that uses a ModelVisual3D object containing a template of a desired 3-D geometry. Examples of this technique are shown by the ListBox control 562 that uses RackVisual, the Rectangle control 574 that uses xyPlaneVisual, and ListBoxItem 570—1, 2 . . . N that use CubeVisual. ModelVisual3D templates may be specified as resources, for example, in a ModelVisual3D repository at the application level.

The markup below shows several illustrative examples of ModelVisual3D template objects. Such objects could be stored, for example, in a general purpose ModelVisual3D repository.

```
<ModelVisual3D ("CubeVisual")>
  <ModelVisual3D.Content>
    <Model3DGroup>
      <GeometryModel3D (Face1 - Front Face)>
        <GeometryModel3D.Geometry>
          [quad mesh for plane with appropriate positions, normals,
          texture coordinates, and triangle indices]
        </GeometryModel3D.Geometry>
        <GeometryModel3D.Transform>
          [transformation to location of front face]
        </GeometryModel3D.Transform>
        <GeometryModel3D.Material>
          <MaterialGroup>
            ...
            <DummyMaterial (changed to DiffuseMaterial
              with VisualBrush by Facade3D)/>
          </MaterialGroup>
        </GeometryModel3D.Material>
      </GeometryModel3D>
      <GeometryModel3D (Face2 - Back Face)>
        [quad geometry, with appropriate transformation]
      </GeometryModel3D>
      <GeometryModel3D (Face3 - Left Face)>
        [quad geometry, with appropriate transformation]
      </GeometryModel3D>
      <GeometryModel3D (Face4 - Right Face)>
        [quad geometry, with appropriate transformation]
      </GeometryModel3D>
      <GeometryModel3D (Face5 - Top Face)>
        [quad geometry, with appropriate transformation]
      </GeometryModel3D>
      <GeometryModel3D (Face6 - Bottom Face)>
        [quad geometry, with appropriate transformation]
      </GeometryModel3D>
    </Model3DGroup>
  </ModelVisual3D.Content>
</ModelVisual3D>
<Model Visual3D ("CylinderVisual")>
  <ModelVisual3D Content>
    <Model3DGroup>
      <GeometryModel3D
        <GeometryModel3D.Geometry>
          [cylinder mesh with appropriate positions, normals,
          texture coordinates, and triangle indices]
        <GeometryModel3D.Geometry>
        <GeometryModel3D.Material>
          <MaterialGroup>
            ...
            <DummyMaterial (changed to DiffuseMaterial
              with VisualBrush by Facade3D)/>
          </MaterialGroup>
        </GeometryModel3D.Material>
      <GeometryModel3D>
    <Model3DGroup>
```

-continued

```
<ModelVisual3D Content>
</ModelVisual3D>
```

Other ModelVisual3D template objects may include application-specific ModelVisual3D templates. An illustrative example is shown below.

```
<ModelVisual3D ("RackVisual")>
    <ModelVisual3D.Children>
        <ModelVisual3D ("CylinderVisual")>
            <ModelVisual3D.Transform>
                [inner ring size/position]
            </ModelVisual3D.Transform>
        </ModelVisual3D>
        <ModelVisual3D ("CylinderVisual")>
            <ModelVisual3D.Transform>
                [outer ring size/position]
            </ModelVisual3D.Transform>
        </ModelVisual3D>
    </ModelVisual3D.Children>
</ModelVisual3D>
```

The Facade 3-D framework generates a suite of 3-D transformations having six degrees-of-freedom with scaling (the "6 D-O-F Transformation Stack") using an ordered transformation stack, and assigns the transformation stack to the ModelVisual3D that makes up the Facade3D.Visual3D. These transformations are:

Theta-Pre-translation rotation around Y
AngOfElev-Pre-translation rotation around X
Translation-X, Y, Z
Yaw-Rotation around Y
Pitch-Rotation around X
Roll-Rotation around Z
Scale-X, Y, Z The following are the attached dependency properties exposed by the Facade 3-D framework that are each configured to map to a transformation:

Facade3D.Theta
Facade3D.AngOfElev
Facade3D.Translation
Facade3D.TranslateX
Facade3D.TranslateY
Facade3D.TranslateZ
Facade3D.Yaw
Facade3D.Pitch
Facade3D.Roll
Facade3D.Scale
Facade3D.ScaleX
Facade3D.ScaleY
Facade3D.ScaleZ By setting and animating these properties, 3-D facades applied to FrameworkElements can be controlled using six degrees of freedom, plus scale.

These properties may also be controlled within current WPF Bindings, Style Setters, Triggers, etc. just like any other property on the source FrameworkElement. Moreover, controlling these properties using WPF Styles that package 3-D functionality in a reusable way is a particularly advantageous feature provided by the present Facade 3-D framework. For example, the rotating 3-D rings used by the carousel 517 (FIG. 5) may use a ListBox Style named OrbitListStyle that packages this functionality and which may be used by other FrameworkElements operating in the UI.

The markup below shows the 6-DOF Transformation Stack expressed in XAML, with bindings to Facade 3-D attached properties underlined:

```
<Transform3DGroup
    <Transform3DGroup.Children>
        <!--Scale-->
        <ScaleTransform3D       ScaleX=[Binding To Facade3D.ScaleX]
                                ScaleY=[Binding To Facade3D.ScaleY]
                                ScaleZ=[Binding To Facade3D.ScaleZ]/>
        <!--Roll-->
        <RotateTransform3D>
            <RotateTransform3D.Rotation>
                <AxisAngleRotation3D Axis="0,0,1" Angle=[Binding To Facade3D.Roll] />
            </RotateTransform3D.Rotation>
        </RotateTransform3D>
        <!--Pitch-->
        <RotateTransform3D>
            <RotateTransform3D.Rotation>
                <AxisAngleRotation3D Axis="1,0,0" Angle=[Binding To Facade3D.Pitch] />
            </RotateTransform3D.Rotation>
        </RotateTransform3D>
        <!--Yaw-->
        <RotateTransform3D>
            <RotateTransform3D.Rotation>
                <AxisAngleRotation3D Axis="0,1,0" Angle=[Binding To Facade3D.Yaw] />
            </RotateTransform3D.Rotation>
        </RotateTransform3D>
        <--Radial transformation-->
        <TranslateTransform3D   OffsetX=[Binding To Facade3D.TranslateX]
                                OffsetY=[Binding To Facade3D.TranslateY]
                                OffsetZ=[Binding To Facade3D.TranslateZ] />
        <!--Angle of Elevation-->
        <RotateTransform3D>
            <RotateTransform3D.Rotation>
                <AxisAngleRotation3D Axis="1,0,0" Angle=[Binding To Facade3D.AngOfElev]/>
            </RotateTransform3D.Rotation>
        </RotateTransform3D>
```

-continued

```
<!--Theta-->
<RotateTransform3D>
    <RotateTransform3D.Rotation>
        <AxisAngleRotation3D Axis="0,1,0" Angle=[Binding To Facade3D.Theta] />
    </RotateTransform3D.Rotation>
</RotateTransform3D>
<Transform3DGroup.Children>
<Transform3DGroup>
```

At runtime, the Facade 3-D framework facilitates the generation of an application 3-D visual tree that is comprised of objects which are sourced from the application XAML, in combination with objects sourced from a ModelVisual3D repository, and the Facade 3-D framework itself. The application visual tree using XAML-like expression is shown in the Appendix.

FIGS. 6a, 6b, 6c, and 6d depict the same application 3-D visual tree shown in Appendix where the origin of segments within the structure of the tree is graphically indicated. Segments surrounded by a solid line originate from the application XAML; segments surrounded by a dashed line originate from a ModelVisual3D repository; and, the segments surrounded by a dotted line originate from the Facade 3-D framework.

As noted above, the 3-D visual tree follows the 2-D structure for the source FrameworkElements that define the 3-D facades. Accordingly, the 3-D visual tree is assembled initially and constantly synchronized during application runtime to be responsive to changes in 2-D application visual tree.

Figure 7:
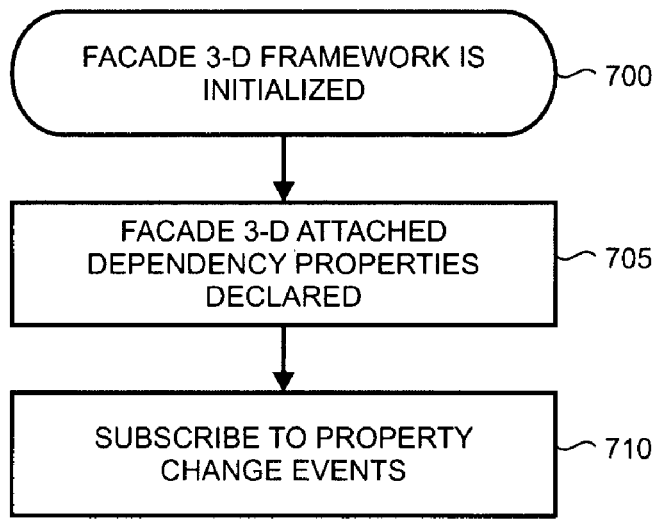
FIGS. 7-17 show respective actions taken by the present Facade 3-D framework in response to the occurrence of events.

As shown in FIG. 7, when the Facade 3-D framework is initialized (700), the static Facade 3-D attached dependency properties are declared (705), and the framework further subscribes to property changed events for many of the declared attached dependency properties by the addition of WPF PropertyChangedCallbacks to the property metadata (710).

Figure 8:
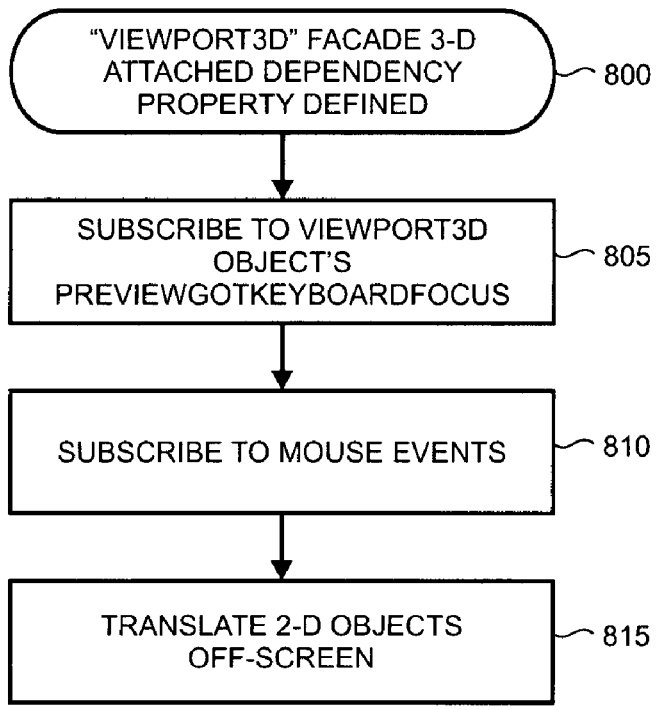

As shown in FIG. 8, when a "Viewport3D" Facade 3-D attached dependency property is defined on a FrameworkElement (800), the Facade 3-D framework subscribes to the Viewport3D object's WPF PreviewGotKeyboardFocus event (805) and all mouse events from the Viewport3D (810). In addition, the 2-D visual tree rooted at the defining FrameworkElement is translated off-screen (815) so that only the 3-D geometry is displayed, and not the defining 2-D source elements.

Figure 9:
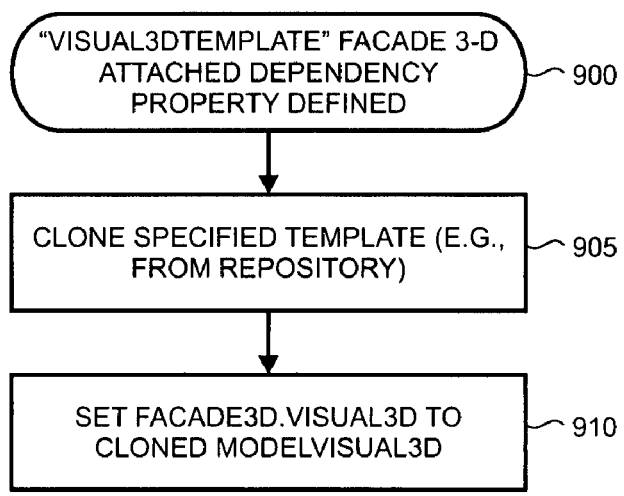

As noted above, a 3-D facade may be specified by defining a Facade3D.Visual3DTemplate to be a ModelVisual3D object that contains the template of the 3-D geometry. Accordingly as shown in FIG. 9, when the Visual3DTemplate Facade 3-D attached dependency property is defined on a FrameworkElement (900), the Facade 3-D framework clones the specified ModelVisual3D template (905) for example, from the general purpose repository as described above. The Facade3D.Visual3D is set to the cloned ModelVisual3D (910).

Figure 10:
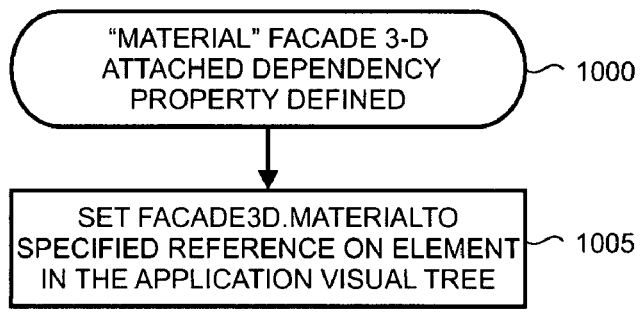

Similarly, as shown in FIG. 10, when a Facade3D.Material attached dependency property is defined on a FrameworkElement (1000), the Facade 3-D framework sets the Facade3D.Material to the specified reference on the element in the 3-D application visual tree (1005).

Figure 11:
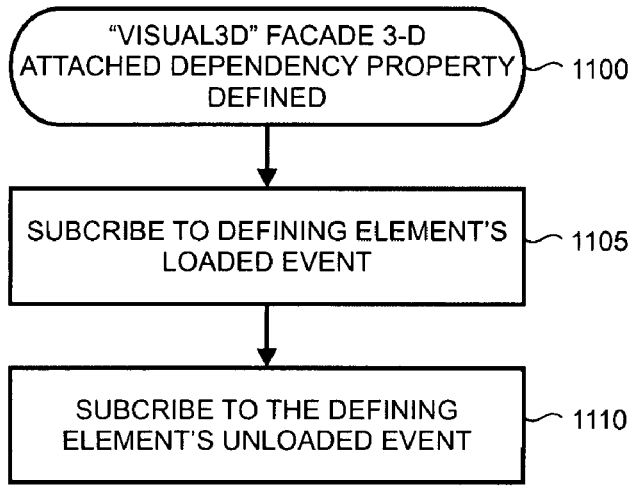

As shown in FIG. 11, when a Facade3D.Visual3D attached dependency property is defined on a FrameworkElement (1100), the Facade 3-D framework subscribes to the defining element's Loaded event (1105) and Unloaded event (1110). This enables synchronization of the 2-D and 3-D application visual trees as shown below.

Figure 12:
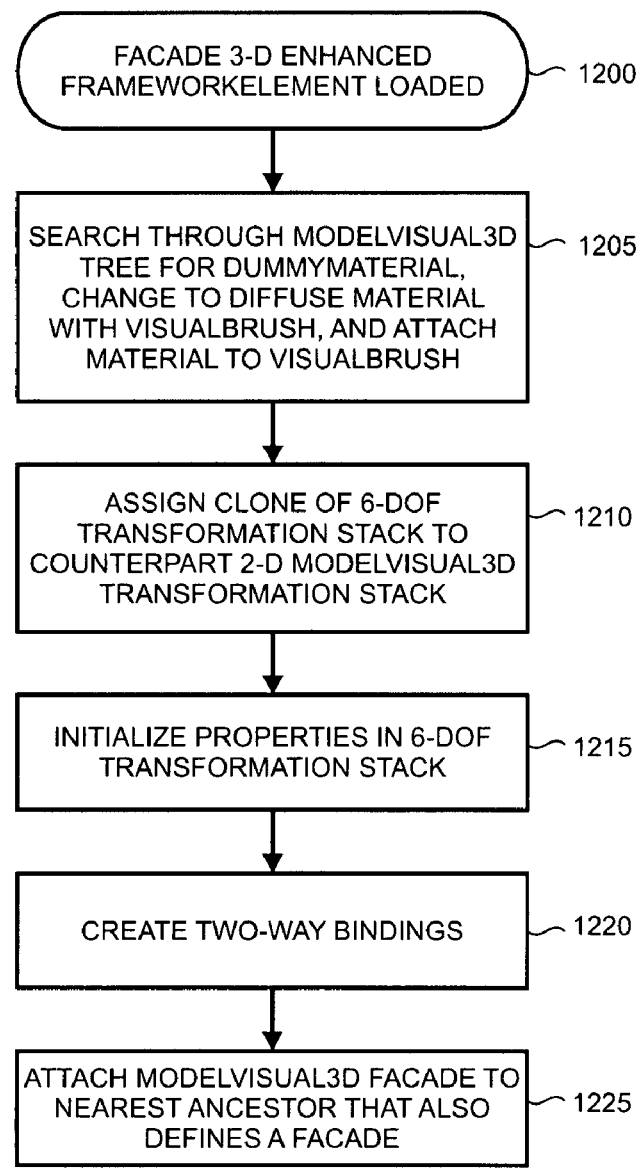

FIG. 12 shows the actions taken by the Facade 3-D framework when a Facade 3-D enhanced FrameworkElement is Loaded (1200). The FrameworkElement's ModelVisual3D tree is searched for a DummyMaterial which is then changed to a DiffuseMaterial with a VisualBrush (1205). This technique is used, for example, when the visuals from some FrameworkElement in the visual tree is desired to appear somewhere on the surface of a 3-D facade geometry. The source FrameworkElement can specify at the application level, for example in the application XAML, the Facade3D.Material which can be bound to any FrameworkElement in the visual tree. If Facade3D.Material is specified, then the Facade 3-D framework will search for a dummy material in the ModelVisual3D's visual tree and change it to a WPF DiffuseMaterial, paint it with a VisualBrush, and then attach the specified Facade3D.Material root to the VisualBrush. The specified Material will typically have some form of binding, either via a template or binding to some other object in the FrameworkElement's visual tree. The separation of object geometry from the material definition enables an application developer to both re-use 3-D geometries that are customized at the application level, and leverage segments of existing 2-D structures.

Continuing with the description of FIG. 12, in further response to a Loaded event, the Facade 3-D framework will also assign a clone of the 6-DOF Transformation Stack to the defining FrameworkElement's counterpart ModelVisual3D (1210). Properties within the 6-DOF Transformation Stack are initialized with the corresponding Facade 3-D property values that are set in the application XAML (1215). The Facade 3-D framework creates two-way bindings between the defining FrameworkElement's Facade 3-D transformation properties (e.g., Facade3D.Yaw) and the corresponding properties of objects in the ModelVisual3D's transformation stack (1220).

The Loaded and Unloaded events correspond respectively to nodes being added and removed from the application visual tree. Therefore, when a source 2-D FrameworkElement is Loaded, its ModelVisual3D facade is "attached" to the ModelVisual3D facade of its nearest ancestor that also has a 3-D facade defined (1225), by adding the ModelVisual3D facade to the Children list of that element.

Figure 13:
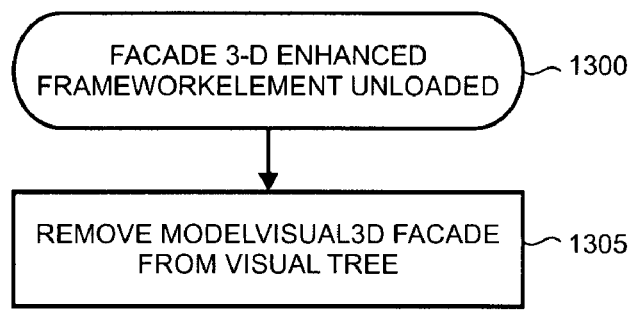

Likewise, as shown in FIG. 13, when the source 2-D Framework Element is Unloaded (1300), the FrameworkElement's ModelVisual3D facade is removed from the application 3-D visual tree (1305).

There are basic properties of FrameworkElements that make them dynamic, interactive, and controllable. The Facade 3-D framework utilizes and, in some cases, may transfer these properties onto the 3-D facades that these FrameworkElements define.

Figure 14:
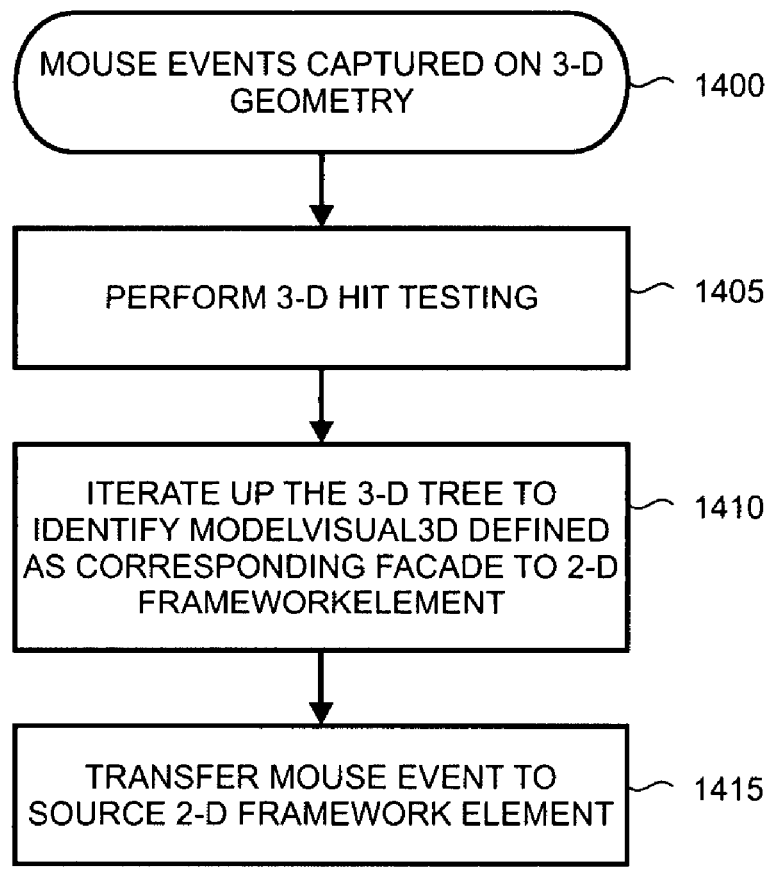

One such property is handling input as shown in FIG. 14. Facade 3-D accomplishes mouse interaction with the 3-D facades by intercepting and handling mouse events captured on their 3-D geometry (1400), and performing 3-D hit tests (1405) to determine which ModelVisual3D was hit.

Facade 3-D is able to perform these steps in code defined within event handlers that are attached to the Viewport3D containing the 3-D tree when these Facade 3-D properties are defined. After determining which ModelVisual3D was hit by the mouse, Facade 3-D iterates up the 3-D tree in order to identify the ModelVisual3D that was defined as the corresponding Facade 3-D visual of some 2-D FrameworkElement counterpart (1410). Finally, Facade 3-D re-raises the captured mouse event on this source 2-D FrameworkElement counterpart (1415). These steps enable application users to interact with the 3-D geometry that comprise the 3-D facades using the mouse vicariously as though they are interacting with the 2-D source FrameworkElements themselves.

Another property that FrameworkElements may have is keyboard focus ("focus" refers generally to the object in the UI which is currently receiving input from, in this case, the keyboard). The 2-D source FrameworkElements that have these Facade 3-D properties defined still exist in the application's visual tree, so focus is handled just as with any FrameworkElement.

Figure 15:
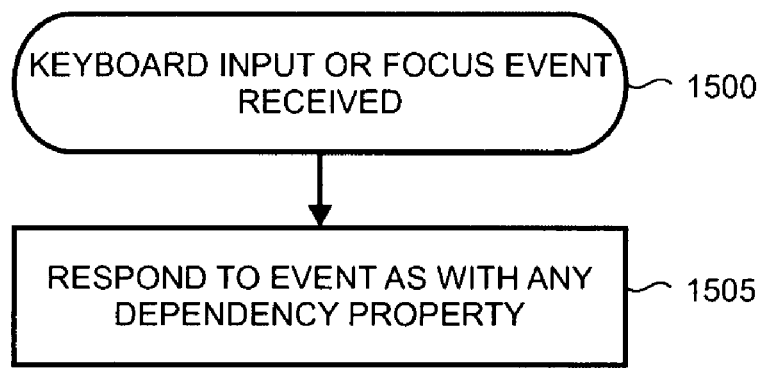

As a result, there is an inherent notion of "focus" that these FrameworkElements can maintain. As indicated in FIG. 15, Facade 3-D properties may respond to focus events (1500) just as any other dependency properties could (1505). For example, if an application developer desires, the 3-D geometry can be scaled up, rotated into place, or moved closer to the screen using a WPF Trigger once the source FrameworkElement receives focus. WPF handles all the logic for transfer of focus itself, since the 3-D geometry is associated with the FrameworkElement in the application visual tree.

Figure 16:
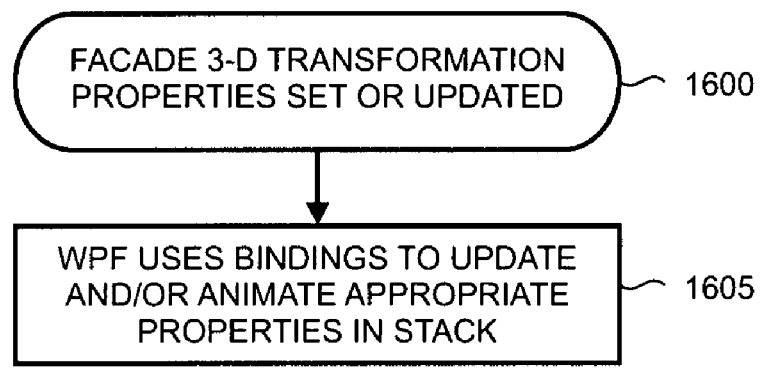

FIG. 16 shows the action taken by the Facade 3-D framework in response to Facade 3-D transformation properties being set or updated (1600). For example, the XAML code or the code-behind may set these transformation properties. Or, these transformation properties may be updated as the application runs, for example, through animation, binding, triggers, etc. Using the bindings created by Facade 3-D, WPF will update and/or animate the appropriate properties within the transformation stack objects accordingly (1605).

Figure 17:
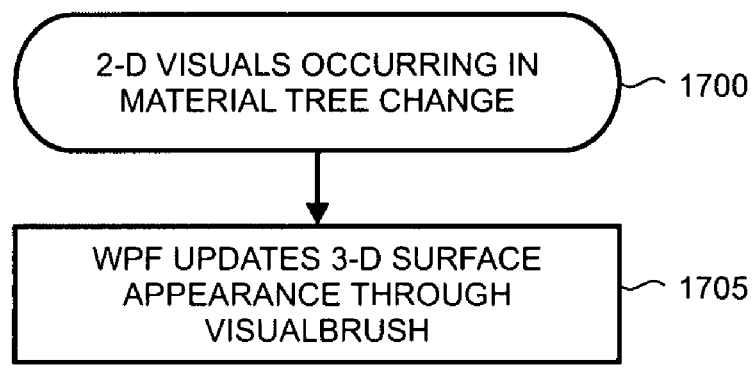

FIG. 17 shows the response to a change in the 2-D visuals (1700) occurring within a visual tree associated with a FrameworkElement's Facade.Material. Such a change may occur for a variety of reasons including, for example, interactive input by the user or animation of properties of a FrameworkElement within the tree. WPF updates the 3-D surface appearance automatically through VisualBrush (1705).

The events and respective actions shown in FIGS. 7-17, and described in the accompanying text, are summarized in the Event-Action table 1800a and 1800b, respectively shown in FIGS. 18a and 18b.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX

```
<Grid>
  <Viewport3D>
    <Viewport3D.Camera>
    [define camera]
    </Viewport3D.Camera>
    <Viewport3D.Children>
    [define lighting visuals, and any static geometry]
    <ModelVisual3D ("RackVisual")>
      <ModelVisual3D.Transform>
        <... />
        <... />
        <... />
        <... />
        <TranslateTransform3D OffsetX="..."
                  OffsetY="1.0"
                  OffsetZ="..." />
      <... />
        <RotateTransform3D (Theta)>
          <RotateTransform3D.Rotation>
            <AxisAngleRotation3D Axis="0,1,0" Angle="{Binding}" />
          </RotateTransform3D.Rotation>
        </RotateTransform3D>
      </ModelVisual3D.Transform>
      <ModelVisual3D.Content>
      [rack geometry]
      </ModelVisual3D.Content>
      <ModelVisual3D.Children>
        <ModelVisual3D ("CubeVisual")>
          <ModelVisual3D.Transform>
            <ScaleTransform3D ScaleX=""
                  ScaleY=""
                  ScaleZ="0.1" />
            ...
            <RotateTransform3D (Yaw)>
              <RotateTransform3D.Rotation>
                <AxisAngleRotation3D Axis="0,1,0" Angle="{Binding}" />
              </RotateTransform3D.Rotation>
            </RotateTransform3D>
            <TranslateTransform3D OffsetX="..."
                  OffsetY="{Binding}"
                  OffsetZ="-2.0" />
```

APPENDIX-continued

```
    ...
    </ModelVisual3D.Transform>
    <ModelVisual3D.Content>
      <Model3DGroup>
        <GeometryModel3D (Face1)>
          <GeometryModel3D.Geometry>
            [quad mesh]
          </GeometryModel3D.Geometry>
          <GeometryModel3D.Transform>
            [translation to location of front face]
          </GeometryModel3D.Transform>
          <GeometryModel3D.Material>
            <MaterialGroup>
              ...
              <DiffuseMaterial>
                <DiffuseMaterial.Brush>
                  <VisualBrush>
                    <VisualBrush.Visual>
                      <ListBoxItem Width="50" Height="50" Content=[List Item 0]>
                        ...
                        [This is the content of the entire UI tree representing
                        the first list Album item in the AlbumList]
                      </ListBoxItem>
                    </VisualBrush.Visual>
                  </VisualBrush>
                </DiffuseMaterial.Brush>
              </DiffuseMaterial>
            </MaterialGroup>
          </GeometryModel3D.Material>
        </GeometryModel3D>
        <GeometryModel3D (Face2)>
          [quad geometry]
        </GeometryModel3D>
        ... [GeometryModel3Ds for cube faces 3-6]
        </GeometryModel3D>
        <GeometryModel3D (Face6)>
          [quad geometry]
        </GeometryModel3D>
      </Model3DGroup>
    </ModelVisual3D.Content>
  </ModelVisual3D>
  <ModelVisual3D ("CubeVisual")>
    [analogous visual for cube representing 2nd item from AlbumList]
  </ModelVisual3D>
  <ModelVisual3D ("CubeVisual")>
    [analogous visual for cube representing 3nd item from AlbumList]
  </ModelVisual3D>
  ...
  ModelVisual3D × N
  [a cube ModelVisual3D object is generated
  for each N items in AlbumList; each cube displays
  the visuals of its corresponding list item on its
  front face]
  </ModelVisual3D.Children>
</ModelVisual3D>
<ModelVisual3D ("xyPlaneVisual")>
  <ModelVisual3D.Transform>
    ...
    <RotateTransform3D (Pitch)>
      <RotateTransform3D.Rotation>
        <AxisAngleRotation3D Axis="1,0,0" Angle="90" />
      </RotateTransform3D.Rotation>
    </RotateTransform3D>
    ...
  </ModelVisual3D.Transform>
  <ModelVisual3D.Content>
    <Model3DGroup>
      "GeometryModel3D>
        <GeometryModel3D.Geometry>
          [xy plane mesh]
        </GeometryModel3D.Geometry>
        <GeometryModel3D.Material>
          <MaterialGroup>
            ...
            <DiffuseMaterial>
              <DiffuseMaterial.Brush>
                <VisualBrush>
                  <VisualBrush.Visual>
                    <Rectangle Background="{StaticResource WhiteDiscRadialBrush}"/>
```

APPENDIX-continued

```
            [This is the same rectangle as in the application's visual tree]
              </VisualBrush.Visual>
            </VisualBrush>
          </DiffuseMaterial.Brush>
        </DiffuseMaterial>
      </MaterialGroup>
    </GeometryModel3D.Material>
      </GeometryModel3D>
    </Model3DGroup>
   </ModelVisual3D.Content>
  </ModelVisual3D>
 </Viewport3D.Children>
</Viewport3D>
<Grid>
 <Grid.RenderTransform>
  <TranslateTransform X="[some value > app width]"/>
 </Grid.RenderTransform>
 [entire 2D UI from original tree]
 </Grid>
</Grid>
```

What is claimed is:

1. A method, having applicability to a UI, for transforming an interactive object operable in a 2-D space into an interactive object that is operable in a 3-D space, the method comprising:
    defining a 2-D visual tree comprising a plurality of nodes, respective nodes in the 2-D visual tree comprising one or more 2-D visual objects, of the interactive object operable in 2-D space, that are renderable in the 2-D space;
    mapping a 3-D visual tree to the 2-D visual tree so that nodes in the 3-D visual tree follow a parallel structure to respective nodes in the 2-D visual tree; and
    providing a 3-D representation by which at least one 2-D visual object is interactively manipulated in the 3-D space, based at least in part upon the mapping, through one or more properties that are defined on the at least one 2-D visual object, the one or more properties belonging to a static class that exposes a plurality of 3-D functionalities.

2. The method of claim 1 in which declarative markup is utilized in at least a portion of the defining.

3. The method of claim 2 in which the declarative markup is XAML.

4. The method of claim 1 in which the one or more properties are attached dependency properties in accordance with a property system under WPF.

5. The method of claim 1 in which programmatic code is utilized in at least a portion of the defining.

6. The method of claim 1 in which event handlers are attached to one or more 2-D visual objects and triggered responsively to the defined one or more properties.

7. The method of claim 1 in which the 3-D visual tree is synchronized to the 2-D visual tree responsively to changes to the 2-D visual tree.

8. The method of claim 1 comprising translating at least one 2-D visual object off-screen for which the 3-D representation is provided.

9. The method of claim 1 comprising specifying a dummy material in the 3-D visual tree.

10. The method of claim 9 comprising searching the 3-D visual tree for the dummy material and replacing the dummy material with a material specified by an application, the specified material being usable for painting a surface of the 3-D representation.

11. The method of claim 10 in which the painting comprises painting using a WPF brush, the WPF brush comprising at least a VisualBrush.

12. A method for handling input events in a UI that is arranged to expose visual objects, the UI defined by a markup and optional associated code-behind, the method comprising:
    creating a plurality of 3-D representations arranged in a 3-D visual tree, respective 3-D representations being associated with respective 2-D visual objects comprising a class of attached properties;
    determining which 3-D representation has captured an input event;
    identifying a 2-D visual object associated with the 3-D representation that captured the input event; and
    transferring the input event to the identified 2-D visual object.

13. The method of claim 12 in which the determining comprises hit testing.

14. The method of claim 12 in which the identifying comprises iterating up the 3-D visual tree until a 2-D visual object corresponding to the 3-D representation that captured the input event is located.

15. The method of claim 12 in which the class comprises a single static class.

16. The method of claim 12 in which the associated 2-D visual object is identified using a reference to the 3-D representation that captured the input event.

17. The method of claim 12 in which the creating comprises using a template that specifies re-usable 3-D geometry.

18. A method for applying a 3-D transformation comprising:
    exposing a 3-D transformation stack to a 3 D facade, the 3-D facade being controllable through static attached dependency properties defined by a UI application on a source 2-D element in a class of visual objects;
    initializing transformation stack properties to values specified by the application; and
    invoking methods provided by the 3-D transformation stack on the 3-D facade.

19. The method of claim 18 comprising controlling the attached dependency properties through WPF properties selected from at least one of binding, style setters, or triggers.

20. The method of claim 18 in which the 3-D transformation stack provides a transformation comprising six degrees of freedom.

* * * * *